United States Patent [19]
Kiyota

[11] 3,897,510
[45] July 29, 1975

[54] PROCESS FOR THE PRODUCTION OF 5-ALKYLIDENENORBORNENE-2

[75] Inventor: Takashi Kiyota, Yokohama, Japan

[73] Assignee: Nippon Oil Co., Ltd., Tokyo, Japan

[22] Filed: Dec. 12, 1973

[21] Appl. No.: 423,928

[30] Foreign Application Priority Data
Dec. 12, 1972 Japan .............................. 47-124602

[52] U.S. Cl. .......................................... 260/666 PY
[51] Int. Cl. ............................................. C07c 13/28
[58] Field of Search .............................. 260/666 PY

[56] References Cited
UNITED STATES PATENTS
3,347,944  10/1967  Fritz et al. .................... 260/666 PY

*Primary Examiner*—Veronica O'Keefe
*Attorney, Agent, or Firm*—Hill, Gross, Simpson, Van Santen, Steadman, Chiara & Simpson

[57] ABSTRACT

In the manufacture of 5-alkylidenenorbornenes-2 by the catalytic isomerisation of 5-alkenylnorbornenes-2 using a complex catalyst formed from an organo-alkali metal compound and a polyamine of certain specified classes, the formation of persistant emulsions during the decomposition of residual catalyst by the addition of water by adding the water in an amount greater than 1 mol equivalent of alkali metal compound in the product liquid and such that the concentration of alkali metal compound in the water is greater than 5 percent. This also results in biasing the partition ratio of the liberated diamine in the mixture towards the organic phase. If desired an alkali metal hydroxide, carbonate or bicarbonate may already be dissolved in the water used.

13 Claims, No Drawings

PROCESS FOR THE PRODUCTION OF 5-ALKYLIDENENORBORNENE-2

This invention relates to the production of a 5-alkylidenenorbornene-2 by the isomerisation of the corresponding 5-alkenylnorbornene-2 in the presence of a catalyst formed from an organo-alkali metal compound and a complexing agent. More specifically, the invention is concerned with the steps of decomposing and rendering inert residual catalyst in the reaction product mixture obtained in such a process and the removal of the decomposed residues without any substantial loss of the complexing agent, and also of salts formed during the preparation of the catalyst.

A process has already been described in Japanese Patent No. 45-41380 for the catalytic isomerisation of a 5-alkenylnorbornene-2, using a catalyst formed from an alkali metal or organo-alkali metal compound, in which residual catalyst is removed by a method including the steps of I. decomposing the catalyst by adding a relatively large amount of water;

II. removing the catalyst residues by washing the reaction mixture with water.

However, this prior process has the drawbacks that, firstly, it is difficult to separate the catalyst perfectly from the reaction product mixture owing to the formation of stable emulsions resulting from the decomposition as well as the removal steps; hence, additional treatment is required to eliminate such emulsions, and loss of important reaction product is incurred. Secondly, in the prior process, the costly complexing agents are extracted into a water phase and are difficult to recover therefrom for reuse; a subsequent problem arises from this fact in that the waste water containing the complexing agent must be properly disposed of so as to prevent environmental pollution. When the amount of water added is equivalent to or larger than that of the reaction product liquid, the complexing agent is entirely removed into the aqueous phase owing to its strong affinity for water. For this reason, recovering and recycling of the costly complexing agent is rendered extremely difficult. Moreover, owing to its strong affinity for water, even under normal conditions as already described, the removal of the complexing agent so as to comply with the prevention of environmental pollution is likewise rendered difficult.

A process has also been described in the prior art in which the complexing agent is separated from the water by distillation. However, such a method is extremely impractical because the complexing agent and water together form a constant boiling mixture from which the condensation of the complexing agent is extremely difficult to effect. Another factor is that the distilled complexing agent forms a uniform phase with water, thus rendering a physical separation of the two practically impossible.

As already mentioned, the distribution ratio of the complexing agent is extremely biased towards the water phase as compared to the organic phase. If however the ratio could be made to be biased radically towards the organic phase, it is evident that the removal process could be carried out without losing the costly complexing agent.

It is an object of the present invention to provide a process for the catalytic isomerisation of a 5-alkenyl-norbornene-2 to form the corresponding 5-alkylidenenorbornene-2 using a catalyst of the kind previously referred to, in which the above-mentioned drawbacks are overcome, i.e. decomposition of the catalyst and removal of the decomposed residues are effected without the formation of objectionable emulsions and so that the costly complexing agent is not entirely lost from the organic phase to the water phase.

According to the invention, there is provided a process for the production of a 5-alkylidenenorbornene-2 by the isomerisation of the corresponding 5-alkenylnorbornene-2 in the presence of a catalyst formed by combining an organo-alkali metal compound with a complexing agent consisting of a. a substituted polymethylene diamine of the general formula:

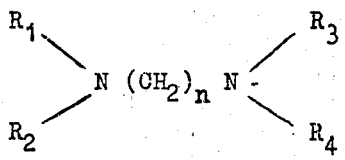

where $n$ is two or a greater integer, and $R_1$, $R_2$, $R_3$ and $R_4$ are alkyl, cycloalkyl or aryl radicals and may be the same or different; or b. a substituted polyethylene diamine of the general formula:

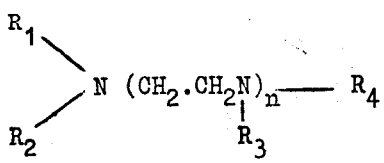

where $n$ is two or a greater integer and $R_1$, $R_2$, $R_3$ and $R_4$ are alkyl, cycloalkyl or aryl radicals and may be the same or different; or c. triethylene diamine ; said process including the steps of decomposing catalyst contained in the product mixture by the addition of water, or an aqueous solution of an alkali metal hydroxide and/or carbonate and/or bicarbonate, in an amount greater than 1 mol equivalent of alkali metal compound contained in said product mixture and such that the concentration of alkali metal compound or compounds in the aqueous phase formed is greater than 5 percent by weight, and thereafter removing the catalyst decomposition products.

With the method of the invention, it has been found to be possible not only to suppress the formation of emulsions but to instantly eliminate in a minimum time emulsions already formed, even emulsions which have remained stable and unchanged for a period of three months. Moreover, with the process of the invention, there is no critical limitation as to the quality of water to be used, or to the atmosphere of the system.

The removal step will be further improved by salting out effects if any salts are present in the aqueous phase, e.g. salts produced during the preparation of the catalyst in situ.

The concentration of alkali in the aqueous phase should, as previously stated, be 5 percent by weight or more. The alkali compound which may be used in the water for increasing the concentration may be a hydroxide of an alkali metal, such as lithium, sodium, or potassium, a carbonate or bicarbonate of such metal, or mixtures of two or more of the compounds. No limitation is placed as to the amount and type of salt which may be present. However, the concentration of alkali compound should take account of the presence of the salt if the salt shows an acidic reaction in water.

The conspicuous advantage of the present invention is that it allows the decomposition and removal treatment to be performed with an amount of water which is relatively small as compared with the amount of the isomerisation reaction product liquid. To be more specific, the treatment may be performed with water alone in an amount which is relatively less than the amount of the product liquid but greater than a mol equivalent of alkali compound therein. It is unnecessary to add alkali compound to the water, because the alkali metal catalyst component and water react to form a hydroxide, e.g. of lithium, sodium, or potassium, thus rendering the alkali concentration of the water phase 5 percent by weight or more. Hence, it is possible to treat the isomerisation reaction liquid without losing the complexing agent to the water phase.

The term "5-alkenylnorbornene-2" used herein represents a compound having the general formula:

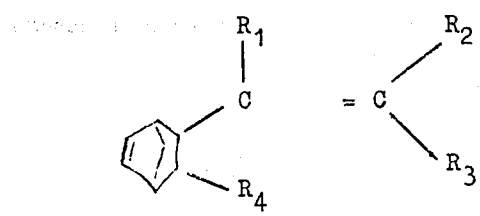

where $R_1$, $R_2$, $R_3$ and $R_4$ are hydrogen, or methyl, or ethyl radicals, typical examples of which are 5-vinylnorbornene-2, 5-isopropenylnorbornene-2, and 5-vinyl-6-methylnorbornene-2.

The reaction of isomerising a 5-alkenylnorbornene-2 to the corresponding 5-alkylidenenorbornene-2 may be represented by the following formula:

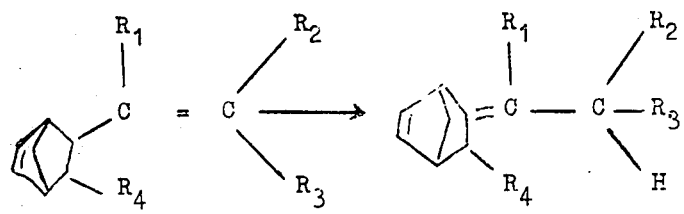

The organo-alkali metal compound used may be a compound represented by the general formula:

R — M where M is lithium, sodium, or potassium; R is an alkyl radical, such as propyl, butyl, or pentyl; an alkenyl radical, such as allyl and methallyl; a cycloalkyl radical, such as cyclohexyl; or an aryl or aralkyl radicals such as phenyl and benzyl.

Alternatively, the organo-alkali metal compound may be a charge transfer complex of sodium or potassium of a polycyclic aromatic compound such as anthracene, or a mixture containing two or more of the above.

Representative complexing agents of type (a) above which may be added to the organo-metallic compound include tetra-substituted polyethylene diamines such as tetramethylethylenediamine and tetramethylpropylenediamine. Representatives of type (b) above include substituted polyethylene polyamines such as pentamethyldiethylenetriamine and hexamethyltriethylenetetramine.

The amount of the complexing agent to be added to the organo-alkali metal compound is not critical, but preferably is within the range of 0.1 to 5 mol per mol of the latter such that the isomerisation may be accelerated. Amounts in excess of this range are not economically feasible, whilst insufficient amounts suppress the isomerisation.

No limitation is based upon the amount of organo-alkali metal compound which may be used. However, it is preferable to use from 0.1 millimol to 50 millimol of this compound per mol of 5-alkenylnorbornene-2.

The catalytic isomerisation of 5-alkenylnorbornenes-2 can also be carried out in a solvent such as an aliphatic or aromatic hydrocarbon which does not adversely affect the reaction.

The isomerisation reaction may be carried out at temperatures ranging from 0° C to 200° C with or without the use of a superatmospheric pressure. The isomerisation reaction may also be carried out continuously or batchwise. Unreacted 5-alkenylnorbornene-2 may be separated by distillation from the 5-alkylidenenorbornene-2 formed and may be used again for the reaction.

According to the invention, a fixed amount of water, or water containing the aforesaid alkali metal compound or compounds is added and mixed with the isomerisation reaction mixture. The liquid mixture thus formed separates into organic and aqueous phases, the aqueous phase being successively removed. The amount of water added must be more than the mol equivalent of the alkali metal compound contained in the reaction product mixture. If not, the catalyst component will not be effectively decomposed and removed. The term "alkali metal compound contained in the reaction mixture" as used herein refers to constitutents of the organo-alkali metal compound of the isomerisation catalyst. If some impurity in the form of alkali metal is contained in the organo-alkali metal compound, the amount of the impurity must be considered in determining the mol equivalent of the organo-alkali metal compound.

As previously stated, in the process of the invention, an aqueous solution of one or more alkali metal hydroxides, carbonates or bicarbonates can be used in place of the water. Examples of alkali metal hydroxides, carbonates and bicarbonates which can be used are NaOH, KOH, LiOH, $Na_2CO_3$, $NaHCO_3$ and $KHCO_3$.

As previously stated, the process of the invention includes the step of mixing the isomerisation reaction product mixture with water, or water which contains one or more alkali metal compounds, in order to decompose the alkali metal compound which is an original component of the catalyst. Thus, the liquid mixture so formed is separated into aqueous and organic phases, and the catalyst residue is removed from the organic phase. Hence, it is necessary to make the concentration of the alkali metal hydroxide compound, carbonate and/or bicarbonate contained in the aqueous phase equal to or greater than 5 percent by weight. A substantial total amount of alkali metal compounds in the aqueous phase can be obtained by adding together the organo-alkali metal compound which is one of the components of the catalyst, alkali metal contained therein as impurity, and alkali metal compounds newly added together with water. If the alkali metal compound concentration of the aqueous phase is made to be below 5 percent by weight, for example, by adding an excessive amount of water to it, the removal of the catalyst residue is made difficult by the formation of emulsions and leads to a decreased recovery rate for the diamine which forms one of the components of the catalyst.

The amount of water or water containing alkali metal compounds to be added in accordance with the invention must therefore be in accordance with the aforementioned conditions. If only water is to be added, the amount should preferably be 10 to 30 times greater than the mol equivalent of the alkali metal compounds. If water containing an alkali metal compound or compounds is to be added, its concentration should normally be up to 30 percent, and it is preferred to add an amount of one-twentieth to ½ times the total amount of the isomerisation reaction product mixture.

The quality of the water to be used is not critical and it is equally possible to use sea water, distilled water, ion-exchanged water, and tap water. Again, as in the previously known processes, the temperature used for the catalyst treatment is not critical. However, the temperature used is preferably in the range of 25° C to 75° C. This is because an extremely low temperature will result in slow sedimentation and decomposition rates of the dispersed suspension, thus causing adverse effect upon the operation, whilst, on the other hand, the amount of reaction product dissolved in the washing water tends to increase at extremely high temperatures. Temperatures in the specified range of from 25° C to 75° C are therefore preferred.

The catalyst treatment step of the invention may be carried out either continuously or batchwise using a stirrer. Continuous treatment may be carried out in a mixer settler, or a rotating plate, in an extraction tower, or packed tower, or using other known devices.

The expensive complexing agent remaining in the organic phase may be separated from the product formed in the isomerisation reaction by distillation or like processes. It is also possible to recover this agent concurrently with the step of separating unreacted 5-alkenylnorbornene-2 from the 5-alkylidenenorbornene-2 formed.

The invention is illustrated, but not limited, by the following examples:

EXAMPLE 1

Into a stainless steel reactor previously purged with nitrogen, there were charged 100 mols of 5-vinylnorbornene-2, 1 mol of sodium benzyl prepared by the reaction of sodium and benzylchloride (approximately 0.9 mol of impurity, in the form of sodium metal is included), and 2 mols of tetramethylethylenediamine. The mixture was stirred for 1 hour at the temperature of 150° C. The mixture formed by the reaction, as observed by gas chromatographic analysis, consists of 5.7 percent by weight of unreacted 2-vinylnorbornene-2 and 94.3 percent by weight of ethylidenenorbornene. The catalyst was completely decomposed when 60 mols of water was added to the reaction product and stirred for 10 minutes at a temperature of 30° C. After the lapse of 2 minutes from the time when the stirring commenced, the mixture separated into organic and aqueous phases. No formation of emulsions was observed. An analysis of the aqueous phase revealed that the entire amount of caustic soda was present in the aqueous phase, which caustic soda was considered to be formed by reaction between water and the catalyst component. The alkali metal compound concentration of the aqueous phase was 6.6 percent by weight. On the other hand, the concentration of tetramethylethylene diamine was below 0.01 percent by weight, indicating that substantially the entire amount was kept in the organic phase.

COMPARATIVE EXAMPLE I

The decomposition of the catalyst was carried out with water in an amount equal to that of the reaction product liquid, which was prepared under identical conditions to that of Example I. The catalyst was completely decomposed after stirring for 8 minutes at a temperature of 30° C. However, the emulsion formed did not disappear, even after the lapse of 3 hours, which in turn meant that the separation of the phases was insufficient. It was observed that 85 percent of the tetramethylethylenediamine used was extracted from the aqueous phase from which the emulsion had already been eliminated. The concentration of caustic soda in the aqueous phase was found to be 0.6 percent by weight.

EXAMPLE II

Into a stainless steel reactor, previously purged with nitrogen, 100 mols of vinylnorbornene-2 was charged. Sodiumphenyl was prepared by reacting sodium and chlorobenzene within the reaction system to provide the sodiumphenyl in an amount of 2 mols, including 1 mol of sodium metal impurity. 2 mols of pentamethyldiethylenetriamine were then added and stirred for one hour at a temperature of 150° C. The resulting reaction product included 93 percent of 5-ethylidenenorbornene-2.

Counter-current contact of the reaction product with sea water was effected in a packed tower, the sea water being poured into the top of the tower and the reaction product liquid fed to the bottom of the tower. When the sea water was charged at a rate of one-sixth times than that of the reaction liquid, an emulsion was formed at the interface of the two liquids. However, by reducing the amount of the water by 10 percent, the formation of an emulsion was avoided, and the amount of amine in the aqueous phase was found to be almost negligible. The alkali metal compound concentration of the contacting water was observed to be 6 percent by weight.

EXAMPLE III

In a reactor as used in Example I, 4 mols of tetramethylethylenediamine, and 2 mols of sodium n-butyl prepared by the reaction of n-butylchloride and sodium, were added to 100 mols of 5-propenylnorbornene, and reacted for 5 hours at 60° C. A reaction product liquid consisting of 94 percent of 5-propylidenenorbornene and 6 percent of propenylnorbornene was thus produced.

The catalyst was rendered completely inert by the addition of 30 mols of water to the reaction product liquid thus formed, and stirring for 5 minutes at 60° C. Stopping of the stirring resulted in instant separation into organic and aqueous phases. The formation of emulsion was also avoided. Analysis of the aqueous phase revealed that nearly the whole of the caustic soda contained in the decomposition products of the catalyst was extracted; its concentration was 13 percent by weight and that of the tetramethylethylenediamine was under 0.01 percent by weight.

Distillation was carried out in the organic phase whereby substantially the whole amount of tetramethylethylenediamine was recovered. The distillation served to separate the tetramethylethylenediamine and 5-propenylnorbornene from 5-propylidenenorbornene. The recovered tetramethylethylenediamine was reused as isomerisation reaction material, and it was found to possess the same properties as when it was first used.

EXAMPLE IV 30 mols of ion-exchanged water were added to an isomerisation reaction product obtained as described in Example II, and stirred for 5 minutes at 50° C to completely decompose catalyst present. Stopping the stirring resulted in instant separation of the organic and aqueous phases, and the formation of an emulsion was likewise not observed. Analysis of the aqueous phase revealed that it included 18 percent by weight of NaOH, 17 percent by weight of NaCl, and a minute amount of pentamethyltriamine.

EXAMPLE V 10 percent by weight of aqueous caustic potash solution was added to the isomerisation reaction liquid formed under the same conditions as described in Example I, and stirred at 30° C. After 8 minutes of stirring, the catalyst was completely decomposed. Even without stirring, the formation of an emulsion and the movement of tetramethylethylenediamine to the aqueous phase were prevented, in contradistinction to the result of Comparative Example I. The KOH concentration of the aqueous phase was observed to be 10 percent by weight and furthermore the entire amount of NaOH considered to be formed during the catalyst decomposition was extracted in the aqueous phase.

EXAMPLE VI 13 percent by weight of an aqueous solution of sodium carbonate was added to the isomerisation reaction liquid formed under the same conditions as in Example I, and stirred at 50° C. After 4 minutes of stirring, the catalyst was completely decomposed. Stopping of the stirring did not result in the formation of an emulsion and the separation between the two phases took place instantly. The Na$^+$-concentration of the aqueous phase was observed to be 2.5 mol/l, and only a minute amount of tetramethylethylenediamine was observed therein.

What I claim as my invention and desire to secure by letters patent of the United States is:

1. In a process for the production of a 5-alkylidenenorbornene-2 by the isomerisation of the corresponding 5-alkenylnorbornene-2 in the presence of a catalyst formed by combining an organo-alkali metal compound with a complexing agent selected from the group consisting of
   a. substituted polymethylene diamines of the general formula :

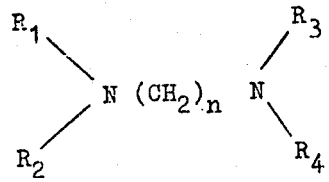

where $n$ is two or a greater integer, and $R_1$, $R_2$, $R_3$ and $R_4$ are alkyl, cycloalkyl or aryl radicals and may be the same or different;
   b. substituted polyethylene diamines of the general formula :

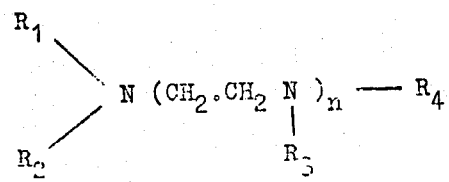

where $n$ is two or a greater integer and $R_1$, $R_2$, $R_3$ and $R_4$ are alkyl, cycloalkyl or aryl radicals and may be the same or different; and
   c. triethylene diamine; said process including the steps of decomposing catalyst contained in the product mixture by the addition of water, optionally containing in solution at least one substance selected from the group consisting of alkali metal hydroxides, carbonates and bicarbonates, in an amount greater than 1 mol equivalent of alkali metal compound contained in said product mixture and such that at least one alkali metal compound is present in the aqueous phase formed in a concentration greater than 5 percent by weight, and thereafter removing the catalyst decomposition products.

2. A process as claimed in claim 1, wherein the catalyst decomposition products are removed by separating the aqueous phase containing alkaline decomposition products from the residual organic phase containing the isomerisation reaction product and separating the liberated complexing agent from this organic phase.

3. A process as claimed in claim 2, wherein said liberated complexing agent is separated from said organic phase by distillation.

4. A process as claimed in claim 3, wherein the liberated complexing agent is separated during a distillation operation carried out to separate the product 5-alkylidenenorbornene-2 from residual 5-alkenylnorbornene-2.

5. A process as claimed in claim 1, wherein said organo-alkali metal compound is a compound of an alkali metal selected from the group consisting of lithium, sodium, and potassium.

6. A process as claimed in claim 5, wherein said organo-alkali metal compound is of the general formula:

$$R - M$$

where R is an alkyl, alkenyl, cycloalkyl, aryl or arylalkyl radical, and M is lithium, sodium, or potassium.

7. A process as claimed in claim 1, wherein said complexing agent is a tetrasubstituted polymethylenediamine.

8. A process as claimed in claim 1, wherein said complexing agent is a substituted polyethylenediamine.

9. A process as claimed in claim 1, wherein the amount of complexing agent added to said organo-alkali metal compound to form said catalyst is from 0.1 to 5 mol per mol of said organo-alkali metal compound.

10. A process as claimed in claim 1, wherein the amount of said organo-alkali metal compound used to form said catalyst is in the range of 0.1 millimol to 50 millimol per mol of said 5-alkenylnorbornene-2.

11. A process as claimed in claim 1, wherein the isomerisation reaction is carried out in a solvent selected from the group consisting of aliphatic and aromatic hydrocarbon solvents.

12. A process as claimed in claim 1, wherein the total amount of water added is from 10 to 30 times greater than one mol equivalent of said alkali metal compound.

13. A process as claimed in claim 1, wherein said added water contains at least a substance selected from the group consisting of alkali metal hydroxides, carbonates and bicarbonates in solution, and wherein the amount of water added is from one-twentieth to one-half times greater than the amount of the reaction product mixture.

* * * * *